Aug. 25, 1970 M. A. KENRICK 3,525,526
BOARD GAME APPARATUS FOR SIMULATING A PRESIDENTIAL ELECTION
Filed Nov. 2, 1966 2 Sheets-Sheet 1

INVENTOR.
MARIE A. KENRICK
BY Kenway, Jenney & Hildreth
ATTORNEYS

Aug. 25, 1970   M. A. KENRICK   3,525,526
BOARD GAME APPARATUS FOR SIMULATING A PRESIDENTIAL ELECTION
Filed Nov. 2, 1966   2 Sheets-Sheet 2
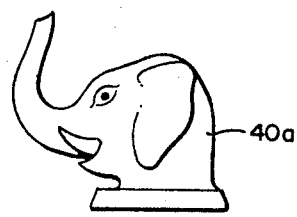
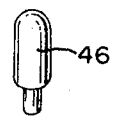
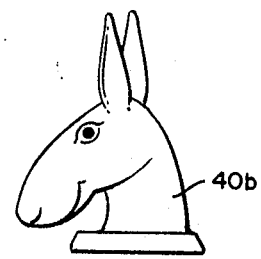
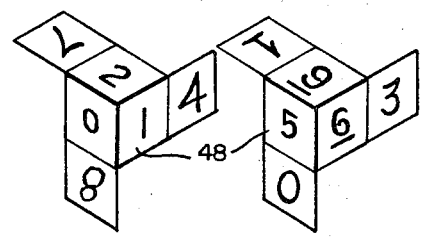
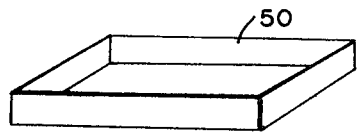
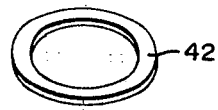
FIG. 3
INVENTOR.
MARIE A. KENRICK
BY
Blair Cesari + St. Onge
ATTORNEYS

# United States Patent Office 3,525,526
Patented Aug. 25, 1970

3,525,526
BOARD GAME APPARATUS FOR SIMULATING A PRESIDENTIAL ELECTION
Marie A. Kenrick, Salt Boxes,
South Yarmouth, Mass. 02664
Filed Nov. 2, 1966, Ser. No. 591,629
Int. Cl. A63f 3/00
U.S. Cl. 273—135
9 Claims

ABSTRACT OF THE DISCLOSURE

A game for simulating a presidential election contest utilizes a game board divided into segments representing States, each having a given number of electoral votes. Party markers and voting pieces are used to effect "capture" of a segment by a political party, the markers and pieces being placed on selected segments by the players in accordance with a strategy which is dependent in part on the outcome of throws of dice each having six faces numbered 0–1–3–5–6–9 and 0–1–2–4–7–8, respectively. Money pieces in limited amounts are given each player for spending to promote his strategy. Special dice may be used to determine the moves to be made. A modified game board in which States are grouped together in "blocs" for the purposes of a shorter game is also described.

---

My invention relates to a game, and more particularly, to a game of strategy for simulating an election.

Among the more desirable features of games, especially those involving a simulation of real-life activity, the elements of chance and strategy play important roles. Games that are wholly dependent on chance fail to provide the psychological satisfaction that is obtained by developing a winning strategy in a game, while games that are wholly dependent upon strategy cannot continually satisfy a wide audience since experienced players will continually dominate the game in competition with younger or less experienced players. An intermediate ground is therefore sought in which the elements both of chance and of strategy combine to form a game in which younger or less experienced players may receive an assist in their fortunes from the element of chance, while the more experienced player may still use his developed skills to advantage.

One of the more interesting real-life situations which may be simulated is the election of the President of the United States. As presently constituted, the United States comprises 51 political subdivisions which participate in the election of the President of the United States, these subdivisions being the 50 States and the District of Columbia. Each of these subdivisions is assigned a given number of electoral votes, the number of votes assigned to any State being largely (although not completely) dependent upon the population of the State. At the present time there are 538 electoral votes distributed among the various States and the District of Columbia. In order to win a presidential election, a candidate must obtain a majority or 270 of these votes; if a candidate wins more than 350 of these votes, he is said to win by a "Landslide."

During the election of a president, each party campaigns for votes. Large sums of money are spent during the campaign to "capture" the electoral votes of a State and to take these votes away from one's opponent. By concentrating efforts on selected States, each candidate attempts to secure blocs of States which are "captured" and firmly in his control. The word "bloc" is used herein to designate a group.

I have developed a game in which the elements of both chance and strategy are combined in a simulation of a local or national election. In particular, I have developed a game for simulating a local or national election in which a plurality of opposing players representing different political parties utilize a game board divided into a plurality of segments corresponding to political subdivisions, such as the counties of a State or the States of the United States. Each player is provided with a group of markers, representing political parties, for distribution on the political subdivisions which initially have been assigned to him by chance but which subsequently may be won or lost by failures or successes in strategy. Voting markers, which represent the capture of the votes available in each of the subdivisions, are assigned to each player and are subsequently distributed on the board in accordance with the subdivisions "won" by each player during the course of the game. In order to more closely simulate an actual election contest, money pieces are distributed to each player in fixed amounts to assist in capturing the votes. The particular moves which a player may make during his turn are determined by the operation of a chance mechanism, such as a pair of specially numbered dice, which is operated by each player in turn and which randomly dictates the number of choices available to each player during his turn.

Accordingly, it is an object of my invention to provide a novel game. Further, it is an object of my invention to provide a novel game which combines elements both of chance and of strategy. Another object of my invention is to provide a novel game for the simulation of local or national elections.

It is a feature of my invention that I provide a mechanism for determining, at each player's turn, sets of moves among which a player must choose.

The above and other and further objects and features of my invention will become more readily apparent when taken in conjunction with the following detailed description of the drawings in which:

FIG. 1 is a diagrammatic view of a preferred embodiment of the playing board utilized in my invention;

FIG. 2 is a diagrammatic view of an alternative form of playing board; and

FIG. 3 is a pictorial view of various playing elements used in the game.

GAME PIECES

One element of the game of my invention is a playing board as shown in FIG. 1 which is a diagrammatic sketch of a playing board 10 which is divided into a group of five rows 12 and ten columns 14 to form a playing area having 50 squares 16. These squares correspond to the respective States of the United States, one of these squares being divided into two parts 16a and 16b to account for the District of Columbia. Each square has printed or inscribed in it the name of the State to which it corresponds, together with the number of electrical votes assigned to that state. Thus, reading across the top row from the left, Nevada, Alaska and Vermont each have three electoral votes, Hawaii, Montana, North Dakota, South Dakota and New Hampshire each have four electoral votes, Pennsylvania has 29 electoral votes and New York has 43 electoral votes. In addition, each square contains a circular recess 18 for purposes to be explained below.

The board 10 may be formed of cardboard, paperboard, plastic, or other material, the particular type of material used being unimportant for the purposes of the game.

In addition to the playing board described above, the following elements are used:

A deck of cards containing at least one card for each State and the District of Columbia (hereinafter included in the term "state") plus several blanks, each card except the blanks having printed on its face the name of a State and the number of its electoral votes;

Poltical party markers for each player. The number of these markers necessary for playing the game of my invention is dependent upon the number of political subdivisions which are represented in the game. For games utilizing the playing board of FIG. 1, a supply of fifty-one markers for each player is appropriate. Although the shape and coloring of the markers are matters of choice, appropriate configurations utilize a white elephant head with uplifted trunk (piece 40a in FIG. 3) for the Republican party and a blue donkey head with upright ears (piece 40b in FIG. 3) for the Democratic party. "Third party" markers having distinct shapes for representing additional parties are provided for each additional player;

Voting pieces, representing the electoral votes of the subdivisions. These voting pieces may advantageously comprise annular rings (piece 42 in FIG. 3) which are placed over the party markers of the respective parties to indicate that particular States have been "captured" by the designated party. A number of rings equal to the number of party markers is required. The voting pieces of each party should have the same color as the party marker for ease of identification;

Money pieces, representing a given denomination. These pieces may be in the form of imitation bills, coins (piece 44 in FIG. 3) or "gold bricks";

Bloc pegs (piece 46 in FIG. 3) which are used to denote captured States which cannot be recaptured by an opponent. The pegs should also have the same color as that of the party markers;

A pair of dice in the form of cubes (pieces 48 in FIG. 3) and having the numbers 0–1–2–4–7–8 and 0–1–3–5–6–9 distributed over the respective faces for reasons which will be explained in detail below.

SETTING UP THE BOARD

The players begin the game by selecting a party. The party markers, voting pieces and bloc pegs associated with the several parties are then distributed to the respective players. Each player is given a fixed amount of money pieces; for two players, 20 money pieces is appropriate. A player may borrow five additional pieces at any time during the game.

The cards are placed face down and cut by each player in turn; the player having the card representing the lowest number of electoral votes then moves first by drawing a card off the top of the pack and placing one of his party markers 40 on the corresponding state. This procedure is repeated by each player in turn until each State is covered by a party marker. A player drawing a blank card is unable to move and forfeits his turn to the next player.

If desired, the board may also be set up by using the dice 48 instead of cards. In this case, the electoral numbers thrown by each player in turn will determine the States on which a player may place his party marker. For example, if the number 03 is thrown, a player may place his party marker 40 on either the District of Columbia, Alaska, Nevada, Wyoming, Vermont or Delaware, provided the desired State is not already occupied by a marker. If a player throws an electoral number and all States having that number are occupied by his own or his opponent's party markers, he forfeits his turn.

A party who has a party marker on a given State is said to "control" that State. Controlling the State is the first step toward "capturing" a state for voting purposes as will be seen below.

STARTING THE GAME

After the board has been completed by the placement of a party marker on each State, the electoral votes of the States controlled by each party are totaled; the player having the highest number of electoral votes is the player to move first.

The pair of dice 48 having the numbers 0–1–2–4–7–8 and 0–1–3–5–6–9 distributed over the respective faces are used during each player's turn. The numbers of the dice 48 have been arranged such that any electoral number on the board can be thrown with the dice. A throw resulting in an electoral number on the board is called a "natural" throw and the resulting number is called a "natural" electoral number.

It is also possible to throw numbers that are not electoral numbers. For example, a throwing of a 5 on one die and an 8 on the other fails to result in a "natural" electoral number since there is no State having either 58 or 85 electoral votes. In such a case, the player is allowed to add, substract, multiply, or divide the thrown numbers in an attempt to "create" an electoral number. For example, 5 and 8 may be added to obtain 13 (corresponding to the electoral votes of North Carolina or Indiana), substracted to obtain 3 (corresponding to the electoral votes of Nevada, District of Columbia, Vermont, Wyoming, Delaware or Alaska), or multiplied to obtain 40 (corresponding to the electoral votes of California). These numbers may not be divided since the resultant quotient is not an integer. If a player fails to obtain either a "natural" number or a "created" number at his turn, he is unable to make any move on the board and he must pass.

Natural numbers take precedence over created numbers and if a natural number is thrown all moves must be based on this number. A player may "create" an electoral number only when he fails to throw a natural number.

MOVES

The number of moves a player may make during his turn is dependent on whether he throws a natural electroal number or creates a number during his turn. If a natural electoral number is thrown, the player has as many moves as there are States of that number having party markers of his own party on them, but he is always given at least two moves. For example, suppose that a player throws a 04 (equals for or forty) and that he has party markers on 7 of the 10 States having four electoral votes. The player is given 7 moves to use on these States immediately in any manner he sees fit during his turn. If the player has a party marker on California (forty electoral votes) he may, at his option, move on that State instead, taking the minimum two moves. If, on the other hand, the player creates a number, he is given only two moves during his turn.

Single moves

A single move consists of any of the following:
(1) Placing a vote ring 42 on one's own party marker on an State;
(2) Removing an opponent's vote ring 42 from one of his party markers; or
(3) Removing an opponent's party marker from any State and replacing it with one's own.

Combined moves

The replacement of both an opponent's party marker and vote ring on a given State with one's own party marker piece and vote ring counts as two moves. A combined move thus offers a bonus of one free move since the removal of the opponent's vote ring, the replacement of his party marker with one's own, and the placement of one's own vote ring would otherwise count as three moves if performed separately or on different States.

The party marker of an opponent may not be removed from a State without first removing the opponent's vote ring (if any) from that State. Further, a player may place vote rings only on party markers of his own party. Thus, if a player wishes to "capture" a State that is already controlled or captured by an opponent, he must first remove the opponent's vote ring (if any) and party marker from that State; only then can he place his own party marker and vote ring on that State. If the removal and replacement is accomplished during a single turn, the player is charged with two moves (a combined move); if the removal and replacement are accomplished in steps during different turns, the player is charged with three moves (one move for removing the opponent's vote ring, one move for replacing the opponent's party marker with the player's own party marker, and one move for placing one's own vote ring on one's own party marker).

To simulate the cost of obtaining votes from an opponent, and to encourage the judicious use of campaign funds, each player is charged one money piece 44 whenever an opponent's vote ring or party marker is removed from the board. This money is placed into a "campaign box" or "discard box" (piece 50 in FIG. 3) at the time that the opposing piece is removed. Since each player starts with a limited amount of campaign funds, a strategy must be developed for conserving the use of the fund, since expenditures of a player during the early portion of the game will prevent him from being able to remove an opponent's playing pieces during later portioins of the game and will thus hinder his obtaining votes.

PEGGING

During the course of a political campaign, certain States become almost irrevocably committed to a particular candidate and are, for all practical purposes, beyond recapture by the opponent. In the game of my invention, States are irrevocably captured by a player whenever four adjacent States lying in a vertcial or horizontal row have both vote rings and party pieces of the player on them. When four States of this nature are obtained, the player capturing these States inserts a block peg 46 into the recess 18 of the board on each of these States; from this point on, these States are firmly in the player's camp and are beyond capture by another. Neither the voting rings nor the party markers may subsequently be removed by an opposing player.

If a player has four captured States on the board which are so pegged, and desires to peg additional States, an advantage can be obtained by cross-pegging, that is, by pegging additional States at right angles to the original pegged States, using one of the original pegged States as an element of the newly pegged chain of States. Thus, if a player has pegged four States in a horizontal row, he may complete a chain of four pegged States in a vertical row by pegging three additional States in a vertical row intersecting the previously pegged horizontal row, one of the pegs in the horizontal row counting also as a peg in the vertical row. This allows the player who has already captured one group of States to capture an additional group of States merely by capturing three additioinal States.

PLAYING THE GAME

In order to illustrate the application of the above rules, the following brief example of a game will be given. Assume that the setting up of the board has been completed so that each State on the board has the party marker of one of the players on it. The player first to move then throws the dice. Assume that the number 04 is thrown (a "natural" electoral number) and that the player has party markers on seven of the ten States having four electoral votes: According to the above rules, the player is given seven moves to use on the ten States having this electoral number in any manner he sees fit. The player may make any of the following moves:

(1) Place vote rings on each of his seven party pieces, thereby "capturing" seven States. If four of these are adjacent to each other in either a vertical or horizontal row, the player may then peg these four States.

(2) Remove his opponent's party markers from the three States on which they are placed and replace them with his own. This will cost the player three of his seven moves and will also cost him three money pieces which he places in the discard box. The player then has four moves remaining and he may distribute them in any manner he desires on the ten States which he now controls. If any four of these ten States are adjacent in either a vertical or horizontal row, it will generally be to the player's advantage to use his four moves by placing vote rings on the four adjacent States in order that he may peg these States and thereby irrevocably capture them. However, the player need not do so and may wish to distribute his moves in a different fashion in order to capture the maximum number of electoral votes. The moves the player makes thus will depend on the strategy has has formulated.

(3) Any other combination of allowable moves. Thus the player may remove only some of his opponent's party markers and leave the rest, thereby conserving his campaign funds. Or, if his opponent has both party markers and vote rings on some of the States, the player may wish to remove the vote rings only or may wish to remove the vote rings and party markers on some of the opponent's States only, distributing his remaining moves among his own States. In any case, the player must remove his opponent's vote ring on a given State before the opponent's party marker is removed from that State and must not, under any circumstances, make a move on any state which has been "pegged" by his opponent.

If, instead of throwing a "natural" electoral number as above, a player throws a number that is not a "natural" electoral number, the player may "create" an electoral number by adding, subtracting, multiplying, or dividing. For example, assume that a player, during his turn, throws a 5 and an 8. The player may add these numbers to create the electoral number 13, subtract them to create the electoral number 03, or multiply them to create the electoral number 40. The player is given two moves to use in any manner he sees fit. Thus, if the player has decided to utilize his moves on the states having the electoral number 03, he may remove two of his opponent's vote rings from States having this electoral number; remove a single vote ring and party marker and replace it with this own party marker and vote ring; remove two of his opponent's party markers which do not have vote rings on them and replace them with two of his own; or place vote rings on two of his own party markers on States having the requisite number of electoral votes. For each playing piece of his opponent that a player removes, of course, he must pay a single money piece.

After a player has completed the moves he is capable of making, he passes to the next player who in turn throws the dice and moves accordingly. This process is repeated, each player taking his turn in sequence, until an end-game situation has developed.

ENDING THE GAME

An end-game situation occurs either when a player has gone broke (either for the first time if players are not allowed to borrow further money pieces or for the second time if they are) or when only four States without voting rings remain. In the former case, the game continues until the player who has exhausted his funds is unable to make a move in three consecutive turns. In the latter case, the ending of the game is accelerated by using only single numbers on the dice and by making a single move on any of the remaining four States having at least one of the thrown numbers in its number of electoral votes. Thus, if the number 16 is thrown and a State having 26 electoral votes (e.g., Ohio) is one of the remaining four States which are voteless, a player may make a single move on this State. For example, a player may remove an opponent's party marker from the State and place his own marker on it, or may place a vote ring on his own party marker if it is on this State. Once any one of these remaining four States is "captured" by placing a party marker and a vote ring on it, it cannot be recaptured. If a player is unable to make a move during three consecutive turns due to the lack of campaign funds, the game is ended as above.

At the end of the game, the player who has captured the most States is credited with fifty votes. Ten votes are credited for each money piece a player has left and ten votes are deducted for each money piece that has been borrowed and used. Each player then totals up the electoral votes of the States he has captured and adds them to his vote credits to obtain his total score. A player having 270 votes win the presidency; a player having 350 votes wins by a Landslide.

SHORT FORM OF GAME

The game described above may usually be played by two players in from one and one-half to four hours. For those who desire a shorter game, the game board of FIG. 2 is particularly appropriate. As shown therein, the game board 20, which may be made of paper, cardboard, or other suitable material, is divided into rows 22 and columns 24, the rows and columns forming blocks 26, there being three rows and six columns on the board as shown. One of the blocks 26 is subdivided into two blocs, these being designated 26a and 26b. Each block represents a group of political subdivisions; for example, a group of states having the same number of electoral votes. Some of the "groups" consist of a single State. Thus, the bloc 26 in the upper left hand corner of the game board represents those ten States having four electoral votes each, the total electoral votes represented by this subdivision thus being 40. Recesses 28 are formed in the board for pegging.

Cards are not necessary in the shorter version, the game board instead being "set up" directly by means of the dice. The players throw the dice and the player throwing the highest number is the first to move. The numbers on the dice are now to be used either singly or in combination, as each player decides during his turn. When used in combination, the player makes his moves on a bloc having subdivisions with the same number of electoral votes as the number thrown or created. When used singly, the player may make his moves on any bloc having subdivisions with a digit in their number of electoral votes equal to a digit in the number as thrown. Thus, if the number 25 is thrown, the player may make his moves on a bloc having a subdivision containing 25 electoral votes (Tex.); may make one move on a bloc having subdivisions with a 2 in their number of electoral votes (Tex., Wis., Mo., Va., Ga., Penn., Mich., Ohio or Ill.) and another move on a bloc having subdivisions with a 5 in their number of electoral votes (Tex., Nebr., Ariz.); may multiply the two numbers to obtain 10 and make his moves on a bloc having subdivisions with ten electoral votes each (Minn., La., Ala., Md.); may add the numbers thrown to obtain 07 and move on a bloc having subdivisions with seven electoral votes each (Kans., W.Va., Miss.); or many subtract to obtain 03 and move on a bloc having subdivisions with three electoral votes each (Alaska, Nev., Wyo., Del., Vt., D.C.). In any case, a player is allowed two moves during his turn.

To further assist in accelerating the game, a player is allowed to remove an opponent's party marker from a given subdivision without first having to remove the opponent's vote ring from that subdivision. To this end, the vote ring and party marker are placed on the board side by side instead of being stacked together as previously. Thus, in this shorter version of the game, it is entirely possible that a given subdivision will be occupied simultaneously by a party marker of one player and the vote ring of another. The definition of a move is also simplified, a move now being defined as either the placing of a party marker or a vote ring on a State not occupied by a corresponding piece of the opponent or the replacement of an opponent's party marker or vote ring with the corresponding piece of the player.

In contrast to the longer version of the game, each player is limited to two moves per turn, regardless of whether the numbers the player uses to make his moves are thrown naturally or are created. As was the case previously, however, the player must pay one money piece for each piece of his opponent that he removes from the board.

The pegging of States to prevent recapture by the opponent is also allowed in the shorter version of the game. However, in this version, pegging is limited to three subdivisions adjacent in either a vertical or horizontal direction, in contrast to the four subdvisions previously needed for pegging. Cross-pegging, using one of the previously pegged States in the perpendicular cross row, is also allowed.

The game is ended whenever a player goes broke and cannot make a move during three consecutive turns. The game is also ended when only three contested States (States that are not captured by any player) remain on the board. When this point is reached, the game continues as previously, but any State previously captured by a player, or any of the three remaining States that become captured by a player during his turn, are made incontestable and the play is concentrated on the remaining uncaptured States.

The scoring in the shorter version is as follows:

The player who has captured the most subdivisions at the end of the game is credited with 100 votes. Ten votes are credited to each player for each money piece remaining in his possession and ten votes are deducted for each money piece that has been borrowed and used. The player winning 270 or more votes wins the presidency; if a player wins 350 votes, he has won by a Landslide.

VARIATIONS

It will be apparent that in a game of this type, numerous changes may be made in the construction of the apparatus and in the playing of the game without departing from the scope and spirit of my invention. For example, the "bloc pegs" which are preferably in the form of dowels one or two inches in length and ¼ inch in diameter and colored the same color as the respective party markers for ease of identification, may readily be formed in any convenient shape, size and color or other marking scheme. In addition the preferred shape of the party markers as described above may readily be changed to suit the taste of any user; the same is true with respect to the vote rings and money pieces. The exact format of the game board is also particularly subject to numerous variations. For example, many players will prefer a game board that has the political subdivisions in the form of the actual outlines of the States. Some difficulties are encountered with this construction, however, in that the areas of he smaller States leave little room for the placement of the party markers unless the game board is of very large size or the party markers are quite small.

The indicia on the dice used in the game of my invention have been selected to enable a player to throw any electoral number on the board. I have previously described how this may be accomplished by numbering the dice as follows: 0–1–2–4–7–8 and 0–1–3–5–6–9, respectively. The following combination will also perform the same function: 0–1–2–3–7–8 and 0–1–4–5–6–9. It is believed that these are the only combination involving 6-sided dice which will allow a player to do this. It will be apparent, however, that dice having more than six sides may be utilized, the indicia on the respective dice faces being changed accordingly. Further, other variations such as the utilization of dice having two or more numbers or other indicia printed on some or all of the faces may be utilized without departing from the spirit of my invention. Further, the ability to throw a "natural" electoral number, although desirable, is not essential and conventional dice could well be utilized with electoral numbers being created as described above.

Having described a preferred embodiment of my invention, I claim:

1. An election game apparatus for use by a plurality of opposing players representing different political parties, comprising, in combination, (A) a game board divided into a plurality of segments, each corresponding to a political subdivision and having a given number of electoral votes designated thereon;

(B) at least two groups of distinguishable markers, the markers of each group shaped to represent a single political party, the total number of such markers being sufficient to permit the placing of a marker on each segment at the start of a game;

(C) at least two groups of distinguishable voting pieces marked for correspondence with said markers;

(D) a plurality of money pieces; and (E) chance means for manipulation by each player in turn to select numerals corresponding to certain of the numerals designating electoral voltes, or numerals including one or more digits corresponding to digits included in said electoral vote designating numerals.

2. The election game apparatus defined in claim 1 which includes visually distinguishable means for each player whereby the player may separately, and in addition to designations effected by said party markers, designate a group or "bloc" of segments.

3. A presidential election game apparatus for use by a plurality of opposing players, said game apparatus comprising a game board divided into a plurality of segments marked to correspond to the different political subdivisions of a political territory, a plurality of sets of playing pieces, each set comprising a plurality of political party markers marked to designate one of two or more political parties, the total number of said markers being sufficient to permit the placing of a marker on each segment, a plurality of voting pieces, and a pair of dice having selected indicia marked on the faces thereof, said dice being manipulable to expose a single face on each die, to thereby display two digits, one or both of which may be used to form one of the electoral vote designating numbers on said board.

4. An election game apparatus according to claim 1 in which said designated electoral votes are those assigned to the several States of the United States and in which said chance means comprise a pair of dice having said digits marked thereon in selected arrangements so that various combinations of faces of the dice generate a set of numbers which includes all the numbers corresponding to the electoral votes associated with said States of the United States.

5. An election game apparatus according to claim 4 in which each dice has six faces, said faces bearing indicia thereon corresponding to the digits 0–1–3–5–6–9 and 0–1–2–4–7–8, respectively.

6. An election game according to claim 4 in which each dice has six faces, said faces bearing indicia thereon corresponding to the digits 0–1–4–5–6–9 and 0–1–2–3–7–8, respectively.

7. An election game apparatus to claim 4 in which the dice have six faces, the digits on the dice being so arranged as to be capable of directly displaying any of the electoral vote designating numreals, or of being added, subtracted, multipled or divided to produce such numerals.

8. An election game apparatus for use by a plurality of opposing players representing different political parties, comprising, in combination, (A) a game board divided into a plurality of segments, each corresponding to a political subdivision and having a given number of electoral votes designated thereon;

(B) at least two groups of distinguishable markers, the markers of each group representing a single political party, the total number of such markers being sufficient to permit the placing of a marker on each segment of the start of a game;

(C) at least two groups of distinguishable voting pieces, corresponding to the markers;

(D) a plurality of money pieces; and (E) chance means for manipulation by each player in turn comprising a pair of six faced dice, said faces bearing indicia thereon representative of the numbers 0–1–3–5–6–9 and 0–1–2–4–7–8, respectively.

9. An election game apparatus for use by a plurality of opposing players representing different political parties, comprising, in combination, (A) a game board divided into a plurality of segments, each corresponding to a political subdivision and having a given number of electoral votes designated thereon;

(B) at least two groups of distinguishable markers, the markers of each group representing a single political party, the total number of such markers being sufficient to permit the placing of a marker on each segment at the start of a game;

(C) at least two groups of distinguishable voting pieces, corresponding to the markers;

(D) a plurality of money pieces; and (E) chance means for manipulation by each player in turn comprising a pair of six faced dice, said faces bearing indicia thereon representative of the numbers 0–1–4–5–6–9 and 0–1–2–3–7–8, respectively.

References Cited

UNITED STATES PATENTS

| | | | |
|---|---|---|---|
| 436,310 | 9/1890 | Hoyt | 273—134 |
| 476,146 | 5/1892 | Von Hunersdorff | 273—134 |
| 753,949 | 3/1904 | Wing | 273—135 |
| 1,425,617 | 8/1922 | Terry | 273—135 |
| 1,616,216 | 2/1927 | Dempsey | 273—135 |
| 2,043,482 | 6/1936 | Lord | 273—134 |
| 2,930,621 | 3/1960 | Gross et al. | 273—134 |

DELBERT B. LOWE, Primary Examiner